United States Patent [19]

Shreve

[11] 4,277,019
[45] Jul. 7, 1981

[54] ELECTRICALLY-CONTROLLED DAMPER

[76] Inventor: James S. Shreve, 10027 Black Ct., Fairfax, Va. 22032

[21] Appl. No.: 148,652

[22] Filed: May 12, 1980

[51] Int. Cl.³ .............................................. F24F 7/06
[52] U.S. Cl. .................................... 236/49; 236/91 E; 165/22
[58] Field of Search ........................ 236/49, 1 B, 91 E; 165/22; 251/68, 69

[56] References Cited

U.S. PATENT DOCUMENTS

| | | | |
|---|---|---|---|
| 2,269,036 | 1/1942 | Nessell | 236/1 B |
| 2,274,614 | 2/1942 | Nessell | 236/1 B |
| 2,474,048 | 6/1949 | Greenlee | 236/49 |
| 3,150,319 | 11/1964 | Nelson | 236/91 E X |
| 3,154,247 | 10/1964 | Carlson | 236/1 B X |
| 3,568,760 | 3/1971 | Hogel | 165/22 |

Primary Examiner—William E. Tapolcai, Jr.
Attorney, Agent, or Firm—Nathan Edelberg; Robert P. Gibson; Saul Elbaum

[57] ABSTRACT

A novel fluid-flow control damper is disclosed. The damper comprises a freely pivotable closure situated in a fluid-flow conduit, such as an air duct. The closure is maintained in a closed position by a simple latching means, and may be maintained in an open condition by means of fluid flow through the conduit. Several of these dampers may be used in combination with a single fluid temperature control device, resulting in a simple, low-cost multizone heating or cooling system.

8 Claims, 13 Drawing Figures

ELECTRICALLY-CONTROLLED DAMPER

RIGHTS OF THE GOVERNMENT

The invention described herein may be manufactured, used or licensed by or for the U.S. Government for governmental purposes without the payment to me of any royalty thereon.

BACKGROUND OF THE INVENTION

Many conventional temperature control systems in use today comprise a single heating and/or cooling means combined with duct means to distribute temperature controlled air throughout a building or other enclosure. Typically, the duct means will comprise several distinct ducts or branches leading to various portions of the enclosure. Ideally, the ducts are arranged and dimensioned in such manner that the air distribution to the various portions of the enclosure will maintain the enclosure or building at a relatively constant temperature throughout. The temperature at which the building is to be maintained is generally controlled by a single thermostat located at a position which is presumed to be representative of the temperature throughout the building.

In actual use, the ideal situation described above cannot be achieved. Due to structural limitations, the ducts running through the building will generally comprise many bends, deviations, and irregularities which will result in somewhat unpredictable impedences to flow therethrough. Exterior conditions, such as solar radiation and wind, will affect each portion of the building in a different manner. Also, warmer air will naturally tend to rise to the upper portions of the building, while cooler air tends to drop to the lower portions. These factors all contribute to creating a temperature imbalance among respective portions of the building or structure. Additionally, if differing types of activities are carried out in the various portions of the building, the varying activity levels will further contribute to the temperature imbalance.

Quite apart from the fact that a temperature imbalance is often created in a situation when it is desirable to have balanced temperature conditions, it is often desirable to segregate a building or structure into distinct zones, maintaining a different temperature level in each zone. The ordinary single source heating or cooling systems in use at present are not capable of maintaining these distinct temperature levels in a predictable and controlled fashion.

One method which has been used to alleviate the problems described above has been to provide individual heating devices in various portions of a building. A standard system of this nature might involve the use of individual radiant heaters in separate rooms or zones within the building, each heater having its own thermostat control. This technique is generally effective to provide desired temperature levels in the respective heating zones, but installation of such a system is relatively expensive, and operation of radiant heaters is generally not energy efficient. Also, the presence of a heat source in an area which is occupied or utilized for other activities generally presents an unacceptable fire hazard.

Another method commonly used to attempt to maintain proper temperature balance is the incorporation of dampers into the ducts of a forced air heating or cooling system. By adjusting the degree to which the dampers in various ducts are opened, one may regulate the relative amounts of air flow through the respective ducts. In this manner, one may attempt to maintain the temperature levels in the various zones of a building at approximately equal values. The manner in which the various dampers must be adjusted in order to maintain a proper temperature balance is generally a matter of guesswork. It is necessary, by trial and error, to continually adjust and readjust the various dampers until one achieves a satisfactory air distribution throughout the building or structure. If one wishes to incorporate automatically operated or controlled dampers in such a system, this technique suffers from the additional drawback that such automatic dampers are generally very expensive motor operated devices.

Accordingly, it is an object of this invention to overcome the drawbacks associated with prior art heating and cooling systems.

Particularly, it is an object of this invention to provide means by which one may maintain, in a controlled fashion, a desired temperature balance throughout a building or structure.

It is an object of this invention to provide means by which one may maintain differing temperatures in different portions of a building utilizing a single heating or cooling means.

It is an object of this invention to provide a low cost multizone heating or cooling system utilizing a single heating or cooling means.

It is a further object of this invention to provide means for adapting a single heating or cooling means to multizone use which may be incorporated into newly installed units or retrofitted into existing systems.

It is a further object of this invention to provide a low cost automatically controlled damper means.

It is yet another object of this invention to provide automatic damper means which is compatible with existing forced air heating or cooling systems.

It is an object to provide such damper means which may be manufactured and installed at very low cost.

SUMMARY OF THE INVENTION

The damper of the present invention comprises a freely pivoted closure means incorporated into a duct. In its closed position, the damper effectively closes the duct to air flow. The damper is maintained in its closed position by a simple latching means which may be automatically opened in response to a signal indicating the need for air flow through the duct. Once opened, the damper is maintained in the opened condition by means of the air flow through the conduit. Gravity provides the necessary force to close the damper once the air flow has ceased.

In a multiduct heating or cooling system, dampers are incorporated into the respective ducts of the system. Each damper is controlled by an individual thermostat associated with various zones of the building. In this manner, each thermostat controls the flow of heated or cooled air to its respective zone. Each zone receives only the amount of conditioned air flow which it requires, any desired temperature balance or imbalance may be maintained in a controlled fashion, and energy to operate the system is utilized in the most efficient manner possible.

DESCRIPTION OF THE PREFERRED EMBODIMENTS

Figure 1:
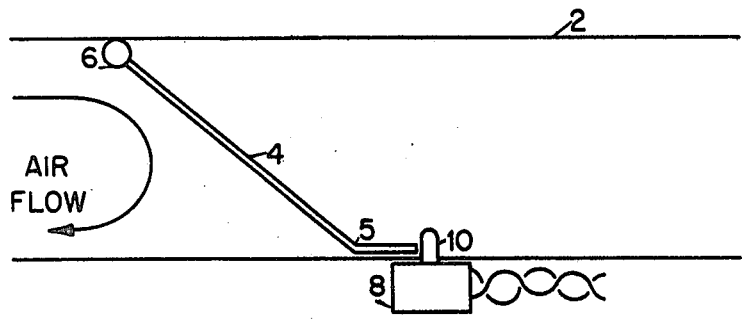
FIGS. 1-2 illustrate a first embodiment of the damper of the present invention.
Figure 2:
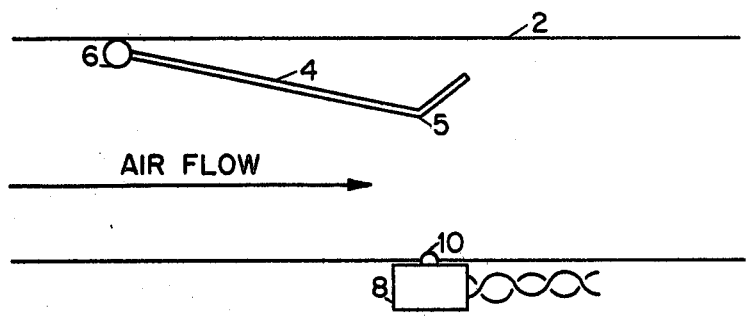

FIGS. 1 and 2 illustrate a first embodiment of the damper of the present invention. Incorporated into duct 2 is a freely pivotable damper 4. The damper pivots about point 6 in a free-swinging manner. Bend 5 provides rigidity to the damper, and facilitates latching of the damper in a closed position. Solenoid 8 is provided in the wall of the duct adjacent the edge portion of the damper 4. As shown in FIG. 1, plunger 10 of the solenoid is maintained in an extended position by spring means. The damper 4 abuts against the plunger 10, and is thereby latched in the closed position shown in FIG. 1.

If the solenoid 8 is energized, the plunger 10 is retracted allowing air flow through the duct to force the damper 4 into an open position, as shown in FIG. 2. When the air flow ceases and the solenoid is no longer energized, as will be described hereinafter the plunger again assumes the extended position. Since the damper 4 is no longer held opened by the air flow, it will fall by gravity, displacing the plunger against the biasing force of the spring thereby returning the damper to the closed position.

Figure 3:
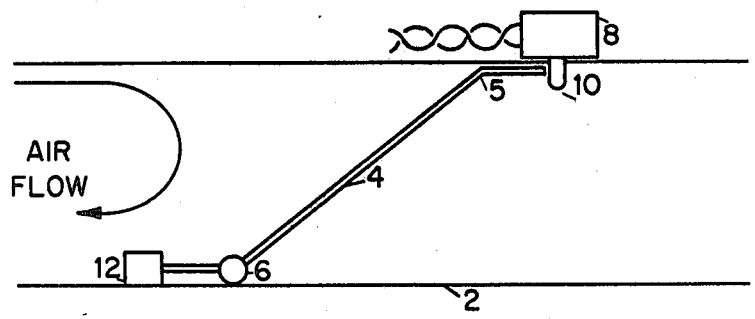
FIGS. 3-4 illustrate a second embodiment of the damper of the present invention.
Figure 4:
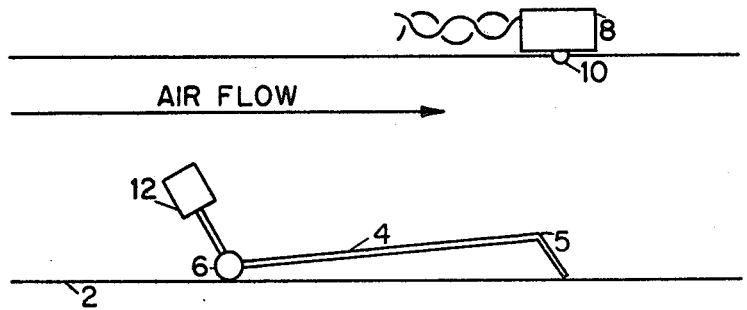

FIGS. 3 and 4 illustrate an alternate embodiment of the damper of the present invention. As shown in FIG. 3, the relative positions of the pivot 6 and the solenoid 8 are interchanged. Since the solenoid is now in an inverted position, gravity will hold the plunger in an extended position, thereby obviating the necessity for spring means. Counterweight 12 provides the necessary gravitational force to effect closing of the damper. When the solenoid is energized, plunger 10 will be retracted thus allowing air flow to pivot the damper into an open position, as shown in FIG. 4. Proper orientation of the counerweight 12 will produce a minimum restoring force when the damper is open, thereby allowing the air flow to keep it fully open, and a maximum restoring force when the damper is in the closed position, thereby assuring that the damper will lift the plunger 10 and latch itself into the closed position.

In use, the dampers are incorporated into the various branches and ducts of a heating system. Each damper is positioned in the system so that it controls flow of conditioned air to a particular area or zone within the structure requiring temperature control. In order to accurately control the temperature within each of these areas or zones, individual thermostats are associated with the respective zones. Each thermostat is incorporated into a control circuit in such manner that actuation of the thermostat will control the damper associated with the respective zone, as well as the heating or cooling means of the system.

Figure 5:
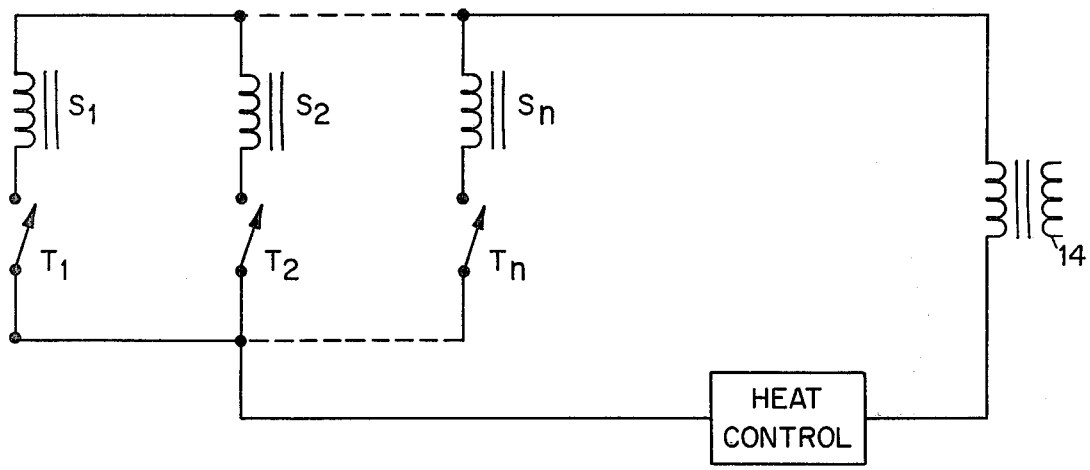
FIG. 5 is a schematic circuit diagram illustrating the manner in which the damper of the present invention is incorporated into a multizoned heating or cooling system.

FIG. 5 is a schematic illustrating a control circuit for a temperature control system in accordance with the present invention. In such a system a building to be heated or cooled is divided into several distinct zones, in accordance with the temperature control needs of the building. Damper means, as described with respect to FIGS. 1-4, are incorporated into the various ducts which lead to the respective zones. Each zone has associated therewith a thermostat which senses the temperature within that zone and provides control signals to the system.

As shown in FIG. 5, the dampers which control flow through the various ducts each have associated therewith a solenoid designated as S1,S2, . . . Sn. Connected in series with the solenoids are thermostats T1,T2, . . . Tn, respectively. Power source 14 provides electrical energy for operation of the control system. In operation, if the temperature in any of the zones drops below a selected temperature, the corresponding thermostat will close. Closure of any thermostat will energize the corresponding solenoid, thereby unlatching the corresponding damper. Simultaneously, the heat control will be activated, providing a flow of temperature conditioned air to the duct system. The air flowing will force the unlatched damper into an opened position, allowing warmed air to flow to the zone requiring heat. The remaining dampers will remain latched, thereby causing all of the warmed air to flow to only the area in which it is needed. If the air is already flowing, closure of another thermostat will unlatch another damper.

The foregoing has been described with respect to a heating system. However, it is to be understood that the system of the present invention is equally applicable to a cooling system. For this purpose it would merely be necessary to provide a thermostat which closes upon a rise in the temperature rather than a thermostat which closes upon a decrease in temperature.

Figure 6:
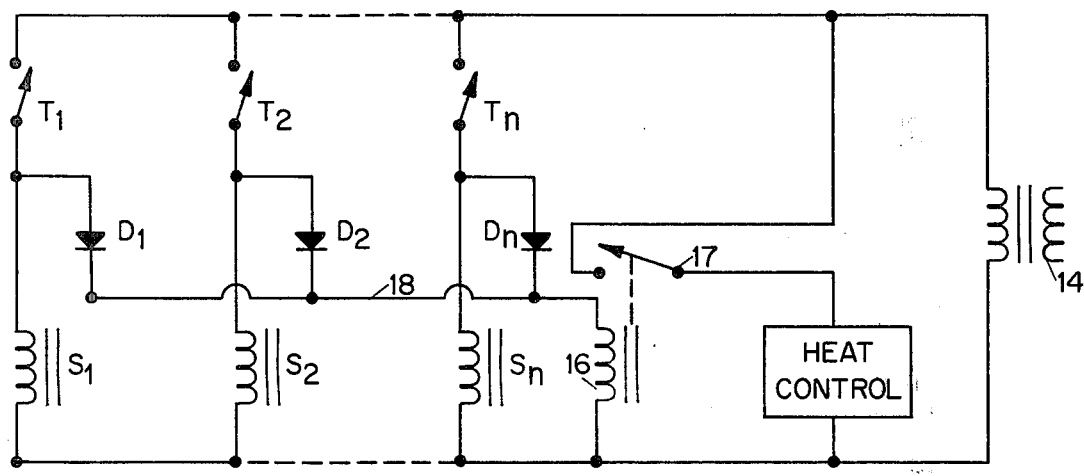
FIGS. 6-8 illustrate alternate embodiments of the system illustrated in FIG. 5.

FIG. 6 illustrates an embodiment of the present invention which comprises several modifications to the basic circuit illustrated in FIG. 5. In this configuration of the system, power to the heat control is provided through switch 17 which is actuated by a relay 16. Power to the relay 16 is provided through bus 18 upon closure of any one of the thermostats T1,T2, etc. The diodes D1,D2, . . . Dn form an "OR" gate for the relay 16, assuring that the current through the relay will not increase as multiple thermostats close.

Figure 7:
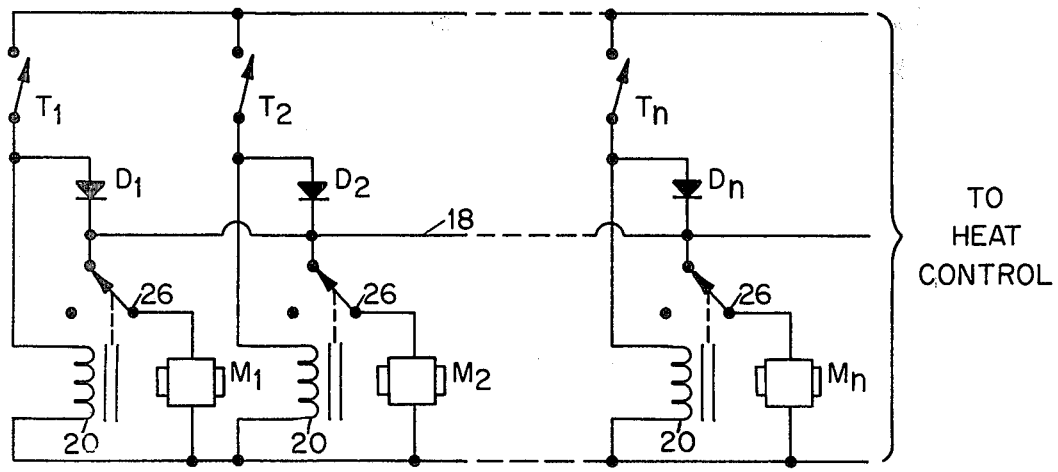

FIG. 7 illustrates a modified form of the invention which incorporates electromagnetic latches for the respective dampers. In this embodiment, electromagnets M1,M2, . . . Mn are incorporated into the duct in place of the solenoid 8. The magnet is positioned adjacent the edge of the damper 4, and, when energized, maintains the damper in a closed position by means of magnetic forces. If the damper comprises plastic, or some other non-magnetic material, a simple metallic latching plate will be provided on the damper to cooperate with the electromagnet.

In the embodiment of FIG. 7, when all of the thermostats are opened and there is no call for heat, all of the electromagnetic latches are deenergized and the dampers remain closed by means of gravitational forces. This is possible due to the fact that there is no air flow through the ducts. When one of the thermostats closes, indicating a call for heat in one of the zones, current will flow through the relay 20 associated with the respective thermostat. The relay 20 opens switch 26, thereby assuring that the electromagnetic latch associated with the respective damper will not be energized. Simultaneously. current passes through bus 18, providing power to all other electromagnetic latches in the system in order to maintain the other dampers in a closed position. Diodes D1, D2, etc act to assure that excess current will not pass through the bus 18. If, for example, thermostat T1 closes, magnetic latch M1 will be deenergized thereby assuring that its associated damper will open upon initiation of air flow to the system. All other magnetic latches are energized thereby maintaining the remaining dampers of the system in a closed position.

Figure 8:
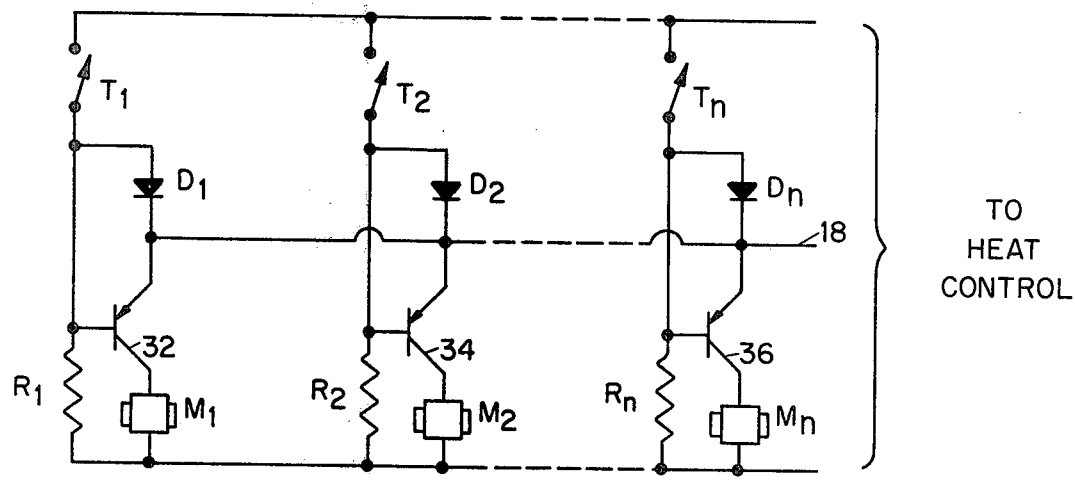

FIG. 8 illustrates an embodiment of the present invention, similar to that of FIG. 7, with the exception that the relays are replaced with transistorized controls 32, 34, 36. Resistors R1, R2, . . . Rn assure that the transistors are in a saturated condition when the respective thermostat is open.

Figure 9:
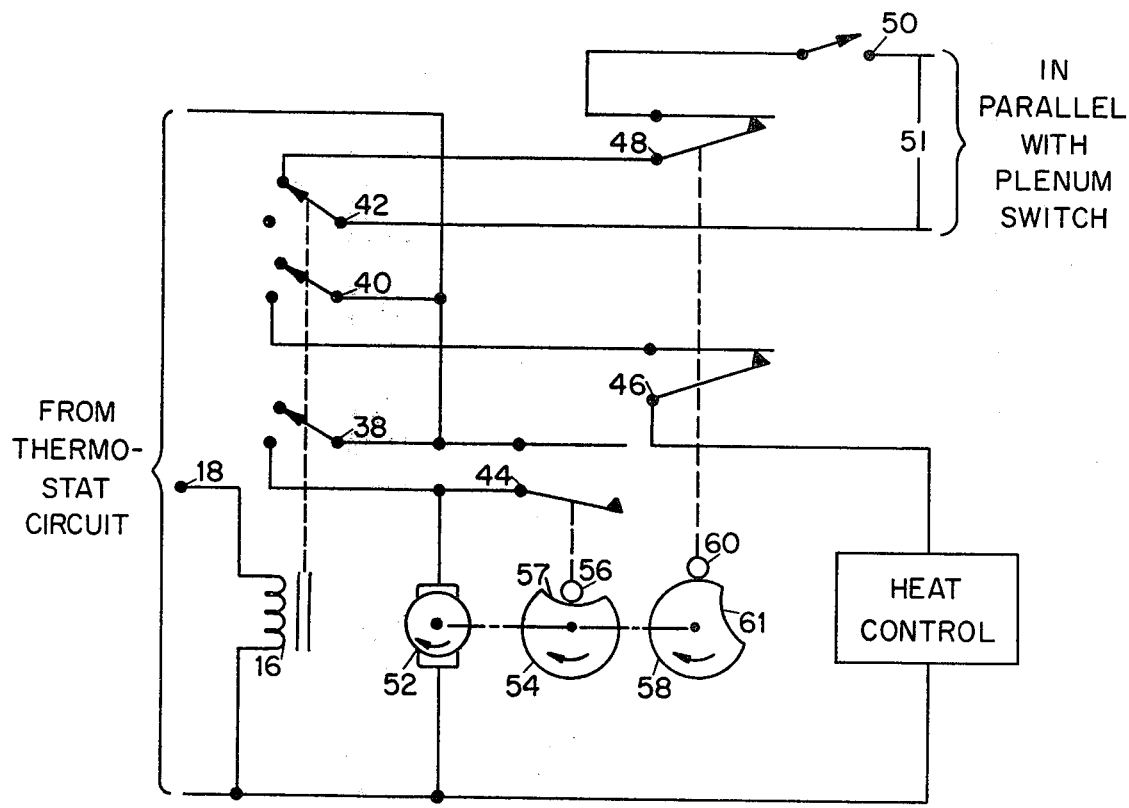
FIGS. 9-10 illustrate embodiments of the present invention which incorporates continuous air circulation control with the temperature control system of the present invention.

FIG. 9 illustrates a modification to the present invention which provides for even greater efficiency in the use of energy. In utilizing any of the embodiments of FIGS. 5-8, a small degree of inefficiency results from the fact that once a damper is open in order to provide heat to a given zone, that damper cannot close until and unless all other zones reach a temperature sufficient to maintain their respective thermostats in an opened condition. For example, if T1 closes, indicating a call for heat in zone 1, the heat control will initiate air flow through the system. If, while warmed air is flowing to zone 1, thermostat T2 closes, the system will remain operational even if thermostat T1 subsequently opens. Therefore, despite the fact that thermostat T1 has opened, the damper associated with zone 1 will remain open due to the air flow through the duct. This will result in a certain amount of conditioned air being fed to zone 1 above and beyond its requirements. The modification of FIG. 9 obviates this inefficiency.

FIG. 9 illustrates a circuit designed to periodically interrupt the air flow through the heating or cooling system in order to allow closure of any dampers which are no longer required to remain open. The circuit and means of FIG. 9 is particularly designed to be associated with the magnetic latch circuits of FIGS. 7 and 8. The circuit of FIG. 9 also provides optional means for maintaining continuous air circulation throughout all zones when there is no call for conditioned air.

When there is no call for heat or conditioned air, relay 16 remains de-energized, as previously described. Switch 42 remains closed, thereby providing power through lines 51 to a fan motor in order to provide continuous air circulation through the system, provided that circulation switch 50 is closed. Switch 40, which would provide power to the heat control, remains open, as well as switch 38 which would provide power to motor 52.

If a call for heat is received from any of the thermostats through bus 18, relay 16 is energized thereby opening switch 42 and closing switches 38 and 40. As switch 42 is opened, power to the blower motor is cut off, thereby causing air flow through the system to cease. The dampers may then close, being latched by the magnetic latch means described with respect to FIGS. 7 and 8. Switch 40 provides power to the heat control, initiating operation of the heating means of the system. When the plenum temperature rises to a sufficient level, the plenum switch (not shown) will initiate operation of the blower motor. Heated air will therefore be fed to the particular zone, the damper of which remains open due to the call for heat therein, as previously described.

Assuming that the original call for heat was from zone 1, it is possible that during the period in which zone 1 is receiving heated air, the thermostat in another zone, T2, may close thereby opening the damper to zone 2. After zone 2 begins receiving heated air, it is possible that zone 1 will no longer require heat. In order to allow zone 2 to continue receiving heated air while permitting the damper controlling zone 1 to close, it is necessary to stop air flow through the system for a brief moment, thereby allowing the damper for zone 1 to close.

For this purpose, when relay 16 is actuated, switch 38 will close thereby actuating motor 52. Motor 52 turns at a relatively slow rate, and is operatively connected to parking cam 54 and interrupter cam 58, causing joint rotation of the two cams. In its initial position, interrupter cam 58 maintains follower 60 in a raised position, and through appropriate linkage maintains contacts 46 and 48 in a closed condition. This allows power to be fed to the heat control and the blower motor. Upon the initiation of rotation of parking cam 54, follower 56 is raised up in order to close the contacts 44. The motor 52, the parking cam 54, and the interrupter cam continue to rotate through the heating cycle.

When rotation of interrupter cam 58 brings depression 61 into alignment with follower 60, contacts 46 and 48 will open thereby shutting off power to the heat control and blower motor. All air flow through the ducts will then cease. Any open dampers associated with a zone which no longer requires heat will therefore be allowed to be latched into the closed position. Upon continued rotation of interrupter cam 58, contacts 46 and 48 will again close, resuming operation of the heater, provided that switch 40 is still closed, and resuming operation of the blower.

If, during rotation of the motor and cams, there is no longer any call for heat through bus 18, relay 16 will again close switch 42 and open switches 38 and 40. Opening of switch 40 will prevent operation of the heater control despite closure of contact 46. Since contacts 44 are held closed by means of the follower 56, the motor 52 will continue to turn even if switch 38 is open due to the absence of a call for heat. Motor 52 will continue to turn until cam 54 reaches a position which brings depression 57 into alignment with follower 56, thereby opening contact 44. The system will then resume the condition illustrated in FIG. 9, allowing for continuous circulation of air without heat.

Figure 10:
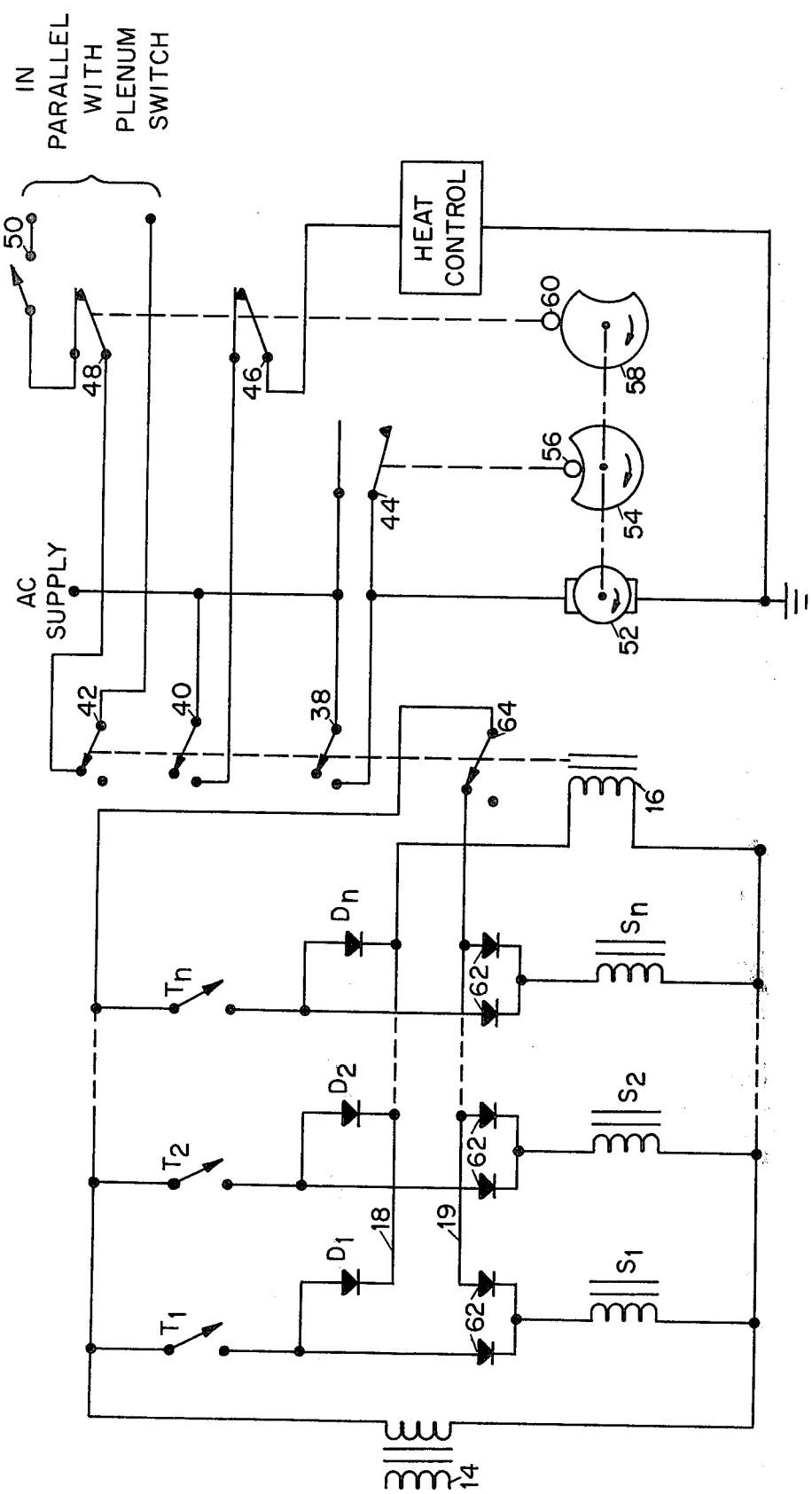

FIG. 10 illustrates a form of the invention very similar to that of FIG. 9, but adapted to be utilized in conjunction with the circuit utilizing solenoid operated latches, as shown in FIG. 5 or 6. In contrast to the magnetically operated dampers, which will open when de-energized, the solenoid operated latches must be energized in order for the dampers to open and allow continuous circulation through the duct system. To provide for this, additional switch means 64 is associated with the relay 16, as illustrated in FIG. 10. Switch 64 remains closed when there is no call for heat from any of the thermostats. This provides power to all of the solenoids, S1, S2, etc, allowing all of the dampers to open in response to air flow through the system. When a call for heat actuates relay 16, switch 64 opens allowing all of the dampers to latch shut. The only damper which will remain unlatched will be that associated with a closed thermostat. Diodes 62 are provided to limit the current through the respective solenoids. In all other respects, the embodiment of FIG. 10 operates in the same manner as that of FIG. 9, as previously described.

Figure 11:
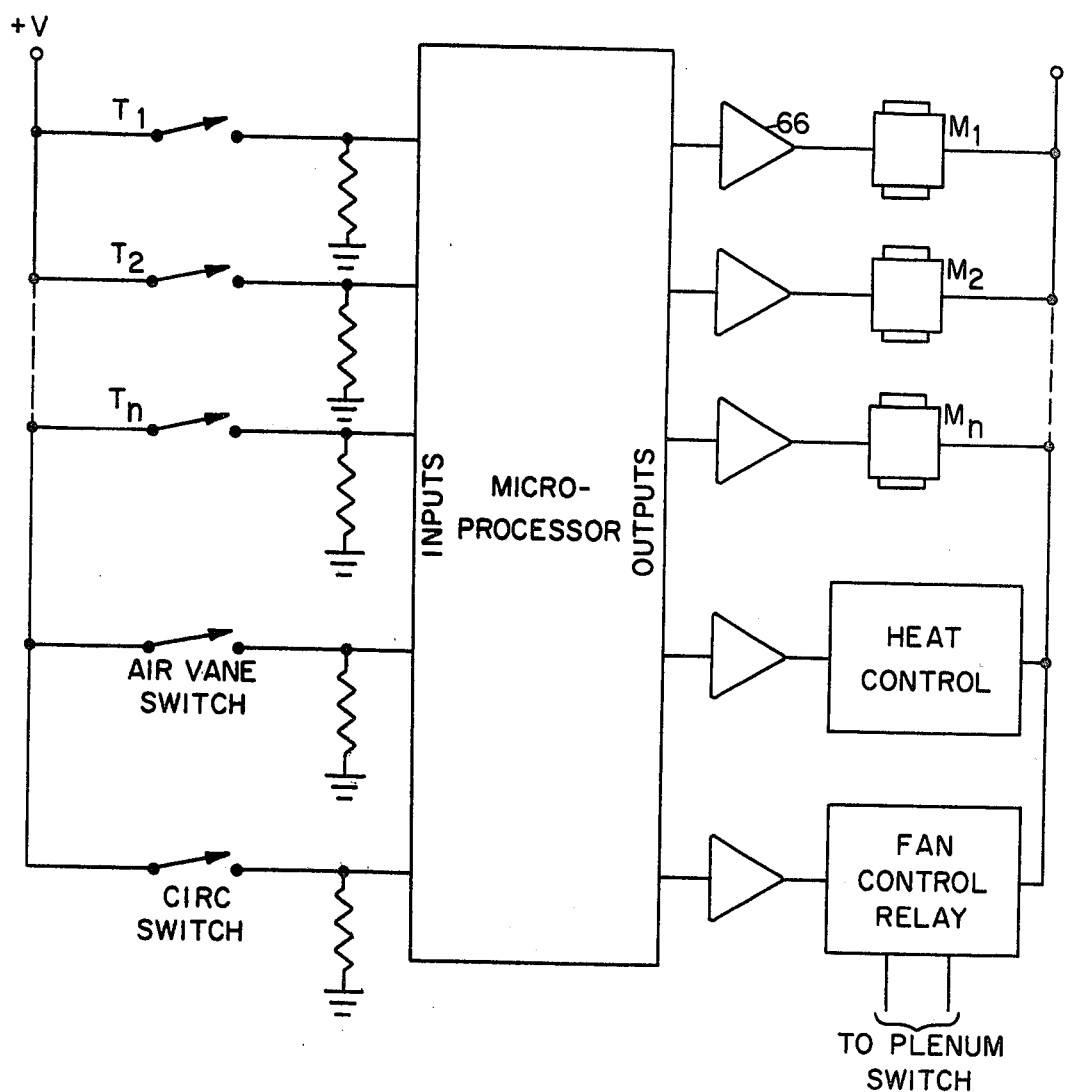
FIG. 11 illustrates an embodiment of the present invention which comprises solid state control means for the temperature control system.

FIG. 11 illustrates yet another embodiment of the invention which utilizes a microprocessor unit for control of the system. Thermostats T1,T2, etc as well as magnetic latches M1, M2, etc are provided in the manner previously described. The air vane switch senses the presence or absence of air flow through the system. The circulation switch may be closed to provide continuous circulation through the system, in the manner previously described.

Each thermostat presents either five volts (logical "one") or zero volts (logical "zero") to the microprocessor depending on whether it is closed or open. Thus, each thermostat outputs one bit of data which is periodically accepted and stored in memory by the microprocessor. The plurality of thermostats provides a number of bits of data to the microprocessor. For a modest number of thermostats, for example 16 or less, the bits could be read in simultaneously and would constitute a single data word.

The microprocessor examines the data word to see if any of the bits are in the logical "one" state (thermostat closed). If so, a command will be generated to turn on the heat control valve. Drivers 66 are employed between the output of the microprocessor and the respective components in order to provide adequate current to operate the components. The microprocessor will also provide appropriate commands to the respective latches to either close or allow to open the respective dampers.

In order to provide the periodic interrupt function described with respect to FIGS. 9 and 10, the microprocessor will periodically compare the current data bit pattern with the preceeding data bit pattern and determine if any thermostats have changed from the closed position to an open position. If any have made such a change, the processor will turn off the heat control valve and the fan control relay, then continuously examine the output from the air vane switch to determine when the air flow through the ducts has stopped. Next, the microprocessor will output appropriate signals to the respective magnetic latches to open or close the proper dampers and then reinitiate operation of the heat control valve and fan control relay.

At this point, the microprocessor again reads in the input data from the thermostats and the process begins over again.

If continuous circulation is desired, the circulation switch may be manually closed. If it is closed, the microprocessor will instruct the fan control relay to remain operational even in the absence of a call for heat. Appropriate output instructions will be directed to the respective electromagnetic latches to allow all, or as many as desired, of the dampers to open.

Figure 12:
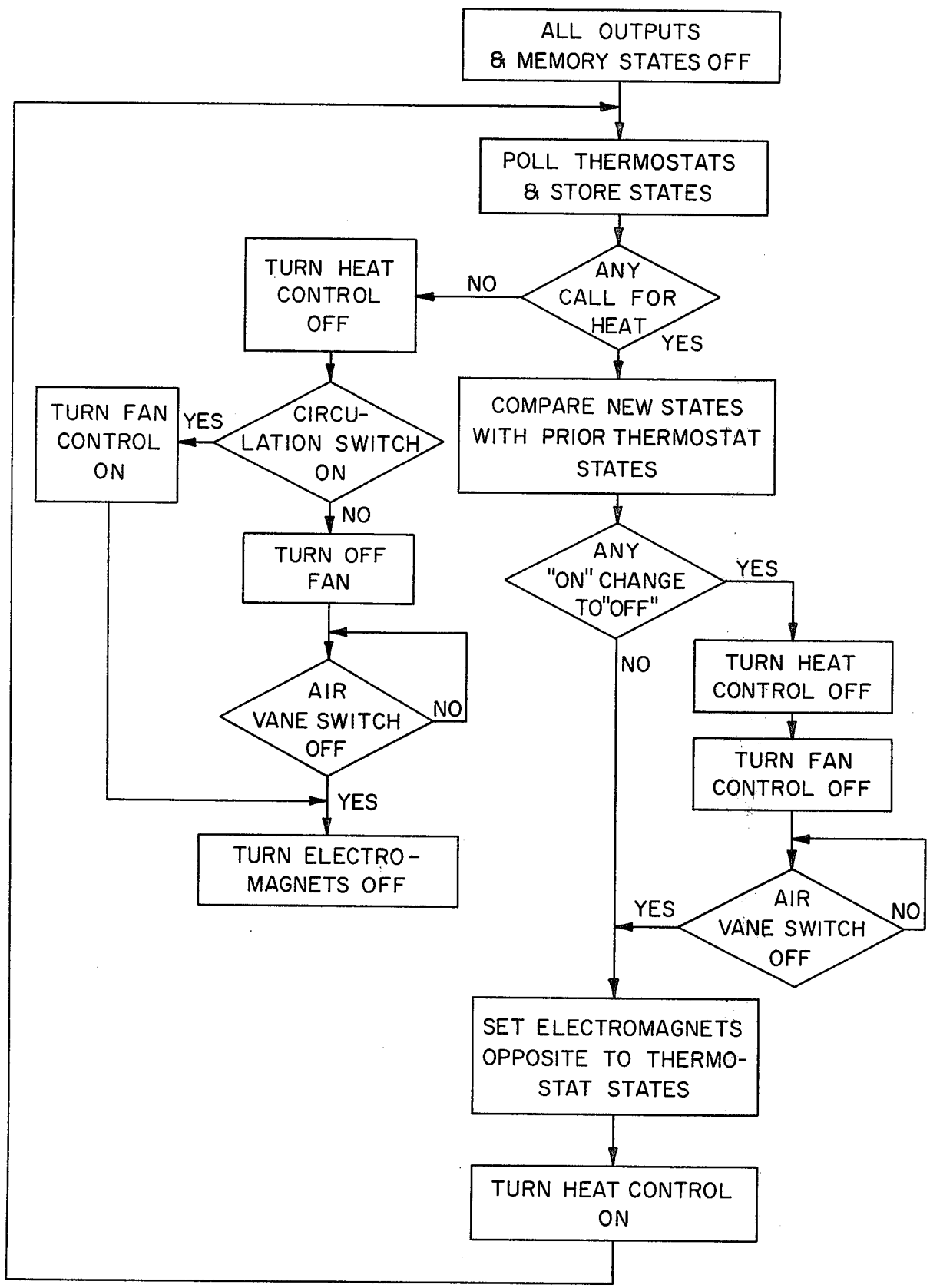
FIG. 12 is a flow chart diagram representing the logical control means of the solid state embodiment of FIG. 11.

FIG. 12 is a logical flow diagram graphically illustrating the logical sequence followed by the microprocessor in the above described control program. It should be recognized that this is a representative program. Other programs are possible, and may be designed to meet specific needs and applications.

Figure 13:
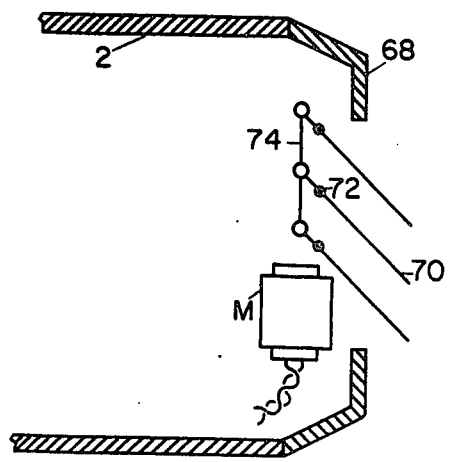
FIG. 13 illustrates yet another alternate embodiment of damper means in accordance with the present invention.

FIG. 13 illustrates yet another alternative embodiment of the damper means of the present invention. Associated with duct 2 is an end cap or register 68. Multiple louvers 70 are pivoted at point 72 within the register. The louvers are linked together for joint rotation about the respective pivots by means of links 74. In the closed position, magnetic latch M will maintain the damper in a position to block air flow from the register, in the manner previously described. It is to be understood, that although the embodiment of FIG. 13 is illustrated in association with a register, the multiple louver embodiment of the damping means may be utilized on the interior of any duct means 2, in a manner similar to that shown in FIGS. 1-4.

The invention provides simple and low cost yet effective means of utilizing scarce energy resources to maximum efficiency in providing heating or cooling for a building. The energy to open the damper is derived from the flow through the duct, while the energy to close the damper is derived from gravity. This obviates the need for motors and sophisticated controls, thereby significantly reducing the complexity and cost of damper controlled heating systems. This also enables the dampers of the present invention to be readily incorporated into heating and cooling systems, thereby providing better control of air distribution, thereby reducing energy consumption.

The damper of the present invention, particularly the embodiments of FIGS. 1-4, has been illustrated as a rigid element pivoted about a hinge means. It is to be understood that this damper could also comprise a material, such as plastic, which could incorporate a flexible hinge portion into the material forming the damper. This would further simplify the manufacture and installation of the damper and significantly reduce costs.

While the invention has been described with reference to the accompanying drawings, I do not wish to be limited to the details shown therein as obvious modifications may be made by those of ordinary skill in the art.

I claim:

1. Temperature control system comprising,
    at least two conduits for carrying flow of thermally conditioned fluid to a corresponding number of zones;
    closure means in each conduit for selectively blocking off flow in each respective conduit or allowing flow therethrough, said closure means being freely movable in said conduit;
    securing means for selectively maintaining said closure means in closed condition or allowing said closure means to open in response to flow through said conduit;
    thermostat means associated with each said zone for sensing temperature within said respective zones; and
    conditioning means to thermally condition fluid to be fed to said conduits;
    wherein said thermostat means are operatively connected with respective ones of said securing means for each said zone, and all of said thermostats are operatively connected with said conditioning means, whereby each said thermostat controls the flow of fluid to its respective zone by simultaneously opening the respective closure means and causing operation of said conditioning means.

2. A system as in claim 1, wherein said fluid is air and said conditioning means comprises means to heat the air.

3. A system as in claim 1, wherein said fluid is air and said conditioning means comprises means to cool the air.

4. A system as in claim 1, wherein said securing means comprises a solenoid operated latching means which allows opening of said closure means when an electrical current is passed through said solenoid.

5. A system as in claim 1, wherein said securing means comprises an electromagnet which secures said closure means in closed position when an electrical current is passed through said electromagnet, and allows opening of said closure means when no current passes therethrough.

6. A system as in claim 1, wherein each closure means opens in response to control of its associated securing means by the associated thermostat, each closure means being maintained in open condition by flow of fluid through the respective conduit, further comprising means to periodically interrupt the flow of fluid through all said conduits, thereby allowing closing of any closure means no longer required to be open.

7. A system as in claim 1, further comprising continuous circulation means providing for continual circulation of fluid which is not thermally conditioned when none of said thermostats are operative to control said conditioning means, said system having further means to assure that all closure means will be in an open condition upon operation of said continuous circulation means.

8. A system as in claim 1, 6 or 7, further comprising microprocessor means to automatically scan the condition of all said thermostats and provide control signals to said securing means, conditioning means and continuous circulation means in response to the condition of said thermostats.

* * * * *